(12) United States Patent
Yan et al.

(10) Patent No.: US 11,131,877 B2
(45) Date of Patent: Sep. 28, 2021

(54) FABRICATION METHOD FOR DYE POLARIZER AND DISPLAY PANEL

(71) Applicant: TCL CHINA STAR OPTOELECTRONICS TECHNOLOGY CO., LTD., Guangdong (CN)

(72) Inventors: Chunqiu Yan, Guangdong (CN); Lixuan Chen, Guangdong (CN); Zhenxia Chen, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 15/776,367

(22) PCT Filed: Jan. 31, 2018

(86) PCT No.: PCT/CN2018/074690
§ 371 (c)(1),
(2) Date: May 15, 2018

(87) PCT Pub. No.: WO2019/000943
PCT Pub. Date: Jan. 3, 2019

(65) Prior Publication Data
US 2020/0257164 A1  Aug. 13, 2020

(30) Foreign Application Priority Data
Jun. 30, 2017  (CN) .......................... 201710530079.2

(51) Int. Cl.
*B05D 3/06* (2006.01)
*B05D 5/06* (2006.01)
(Continued)

(52) U.S. Cl.
CPC ..... *G02F 1/133528* (2013.01); *B05D 3/0254* (2013.01); *B05D 3/067* (2013.01);
(Continued)

(58) Field of Classification Search
CPC ........ B05D 3/0254; B05D 3/067; B05D 5/06; G02B 5/3025; G02B 5/305; G02B 5/3041; G02B 5/30–305
(Continued)

(56) References Cited

U.S. PATENT DOCUMENTS

| 5,286,420 | A | * | 2/1994 | Claussen | ............... | B29C 39/123 |
|---|---|---|---|---|---|---|
| | | | | | | 264/1.34 |
| 2004/0135117 | A1 | * | 7/2004 | Liu | .......................... | C09B 1/503 |
| | | | | | | 252/299.1 |
| 2011/0177315 | A1 | * | 7/2011 | Iwahashi | ................. | C09B 31/28 |
| | | | | | | 428/220 |

FOREIGN PATENT DOCUMENTS

| CN | 102171592 A | 8/2011 |
|---|---|---|
| CN | 104914615 A | 9/2015 |

(Continued)

*Primary Examiner* — Elizabeth A Burkhart
(74) *Attorney, Agent, or Firm* — Leong C. Lei

(57) ABSTRACT

A fabrication method of a dye polarizer and a display panel are provided. The fabrication method includes: dissolving a dye mixture and a reactive monomer in a solvent to form a polarization film solution, in which the dye mixture is formed by mixing multiple dichroic dyes and the dye mixture functions to absorb visible light of all wave band; coating the polarization film solution one a base, followed by alignment, to allow the reactive monomer to cure on the base; and repeating the step of forming the dye polarization film for n times to form a dye polarizer including n+1 stacked layers of the dye polarization, where n is a nature number greater than or equal to 2. The display panel includes the dye polarizer that is formed with the fabrication method described above.

12 Claims, 2 Drawing Sheets

(51) Int. Cl.
   *G02F 1/1335*   (2006.01)
   *G02B 5/30*    (2006.01)
   *B05D 3/02*    (2006.01)
(52) U.S. Cl.
   CPC ............. *B05D 5/06* (2013.01); *G02B 5/3016* (2013.01); *G02B 5/3025* (2013.01); *G02F 1/133514* (2013.01); *G02F 2202/04* (2013.01)
(58) Field of Classification Search
   USPC ...................................... 427/163.1, 162–169
   See application file for complete search history.

(56) References Cited

FOREIGN PATENT DOCUMENTS

| | | | |
|---|---|---|---|
| CN | 105807472 | A | 7/2016 |
| CN | 106019453 | A | 10/2016 |
| CN | 107144911 | A | 9/2017 |
| WO | 2014148639 | A1 | 9/2014 |

* cited by examiner

FABRICATION METHOD FOR DYE POLARIZER AND DISPLAY PANEL

CROSS REFERENCE TO RELATED APPLICATIONS

This application claims the priority of Chinese Patent Application No. 2017105300792 filed on Jun. 30, 2017, titled "Fabrication Method of Dye Polarizer and Display Panel", the disclosure of which is incorporated herein by reference in its entirety.

BACKGROUND OF THE INVENTION

1. Field of the Invention

This application relates to the technical field of display panels, and more particularly to a fabrication method for a dye polarized and a display panel.

2. The Related Arts

A polarizer is a very important part of a liquid crystal panel and determines, to quite an extent, key characteristic indexes of the liquid crystal panel, such as contrast, transmission rate, brightness, and thickness. Among the polarizers, dye polarizers are a kind of important polarizers. The state-of-the-art dye polarizers have a relatively narrow absorption wavelength of light, leading to lowered utilization of light and also low degree of polarization.

SUMMARY OF THE INVENTION

In view of the above, this application provides a fabrication method for a dye polarizer and a display panel.

The fabrication method for a dye polarizer comprises: adding a dye mixture and a reactive monomer in a solvent for dissolving therein to form a polarization film solution, wherein the dye mixture is formed by mixing multiple dichroic dyes and the dye mixture functions to absorb visible light of all wave band; coating the polarization film solution on a base and carrying out alignment, and allowing the reactive monomer to cure on the base to form a dye polarization film; and repeating the step of forming the dye polarization film for n times in order to form a dye polarizer that comprises n+1 layers of the dye polarization film that are stacked on each other, wherein n is a natural number that is greater than or equal to 2.

In the above, the dye mixture is formed by mixing three dichroic dyes of red color, orange color, and cyan color.

In the above, the solvent comprises dichloromethane or acetone.

In the above, in the step of "coating the polarization film solution on a base and carrying out alignment, and allowing the reactive monomer to cure on the base to form a dye polarization film", alignment is carried out as a light alignment operation conducted with linearly polarized light.

In the above, in the step of "coating the polarization film solution on a base and carrying out alignment, and allowing the reactive monomer to cure on the base to form a dye polarization film", curing is conducted by applying heat to the reactive monomer to cure the reactive monomer.

In the above, in the step of "coating the polarization film solution on a base and carrying out alignment, and allowing the reactive monomer to cure on the base to form a dye polarization film", curing is conducted by subjecting the reactive monomer to irradiation of ultraviolet light to have the reactive monomer cured.

In the above, the base comprises a substrate of a display panel or a functional film layer of the display panel.

A display panel comprises a dye polarizer. The dye polarizer is formed with the fabrication method described above.

In the above, the display panel comprises a liquid crystal panel, a quantum dot panel, or an organic light-emitting display panel.

In the above, the display panel comprises a liquid crystal panel, the liquid crystal panel comprising a thin-film transistor substrate, a color filter substrate, and a liquid crystal layer filled between the thin-film transistor substrate and the color filter substrate; and the dye polarizer is arranged between the thin-film transistor substrate and the liquid crystal layer and also between the color filter substrate and the liquid crystal layer.

The solution of this application includes a dye mixture that is formed by mixing multiple dichroic dyes and can absorb visible light of all wave band so as to expand the range of wavelength of light absorbable by a regular dye polarizer and thus improve utilization of light. Through formation of dye polarizer by stacking multiple layers of dye polarization film, the degree of polarization of the dye polarizer can be increased.

BRIEF DESCRIPTION OF THE DRAWINGS

To more clearly explain the technical solution of an embodiment of this application, a brief description of the drawings that are necessary for the embodiment of this application is given below. It is obvious that the drawings that will be described below show only some embodiments of this application. For those having ordinary skill of the art, other drawings may be available from these attached drawings without the expense of creative effort and endeavor.

DETAILED DESCRIPTION OF THE PREFERRED EMBODIMENTS

A clear and complete description will be given to technical solutions provided by embodiments of this application with reference to the attached drawings of the embodiments of this application. However, the embodiments so described are only some, but not all, of the embodiments of this application. Based on the embodiment of this application, other embodiments are available to those having ordinary skills of the art without the expense of creative effort and endeavor and are considered belonging to the scope of protection of this application.

Figure 1:
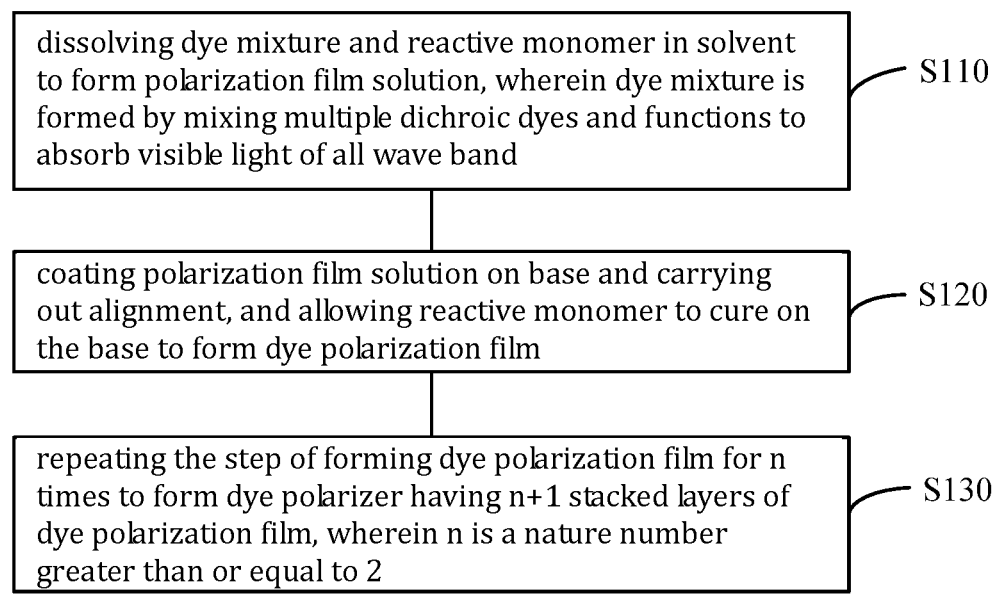
FIG. 1 is a schematic flow chart illustrating a fabrication method according to an embodiment of this application.

As shown in FIG. 1, a fabrication method 100 for a coating type dye polarization assembly according to an embodiment of this application comprises:

S110, adding a dye mixture and a reactive monomer in a solvent to dissolve therein to form a polarization film solution, wherein the dye mixture is formed by mixing multiple dichroic dyes and the dye mixture is provided to absorb visible light of all wave band;

S120, coating the polarization film solution on a base and carrying out alignment, and allowing the reactive monomer to cure on the base to form a dye polarization film;

S130, repeating a number (n) of times of the above step of forming the dye polarization film in order to form a dye polarizer that comprises said number plus one (n+1) layers of the dye polarization film, wherein n is a natural number that is greater than or equal to 2.

Specifically, in S110, the dye mixture and the reactive monomer are both of a powder form and the two are fully dissolved in the solvent to cause a polymerization reaction in order to form the polarization film solution. The dye mixture may comprise multiple dichroic dyes mixed together. The multiple dichroic dyes are uniformly mixed and are subjected to grinding to form the dye mixture. The dye mixture may absorb visible light of all wave band, meaning the range of wavelength of stray light absorbable by the dye mixture is relatively wide and may cover all wavelengths of the visible light. For example, a dye mixture that is close to black color could be formed by mixing three dichroic dyes of red color, orange color, and cyan color may realize absorption of visible light in the wavelength range of 400-700 nm. It is apparent that the dye mixture can be formed by mixing other types of dichroic dyes and the color of the dye mixture is not necessarily close to black color. In addition, an ingredient dichroic dye of the dye mixture may be a mixture of multiple monochromic dyes. The solvent can be a liquid state dispersion system formed of dichloromethane or acetone or may be other melting state dispersion system according to requirements. The reactive monomer a heat-based reactive monomer or may alternatively be a light-based reactive monomer.

In S120, the polarization film solution formed in S110 is coated on the base and is subjected to alignment. Specifically, spin coating may be adopted for uniformly coating the polarization film solution, wherein the base is placed on a turn table of spin coating facility, followed by setting the rotational speed and the rotation interval of the turn table, so that the base rotates with the turn table. Then, the polarization film solution is dropped onto the base. The dropped polarization film solution is uniformly coated on the base during the rotation process due to the effect of centrifugal force induced by the rotation. In the instant embodiment, preferably, the rotational speed is set as 500-2000 revolutions per second and the rotation interval is set as 10-120 seconds. These settings of the rotation parameters allow the polarization film solution to be uniformly coated by reasonable centrifugal force and also prevent aggregation of the dyes contained in the polarization film solution caused by being excessively acted upon by the centrifugal force. In other embodiments, the rotational speed and the rotation interval can be set as desired for practical needs and are not limited to what provided in the above.

In S120, the base is a substrate of a display panel. The substrate can be made of materials including glass, polycarbonate (PC), polyethylene terephthalate (PET), triacetyl cellulose (TAC), and fiber reinforced polymer (FRP). The base can be a functional film layer of a display panel. The functional film layer can be made with a film forming process so as to form a film that demonstrates a specific function on a substrate.

In S120, "alignment" refers to having molecules of the dye mixture orienting in a predetermined direction on the base to provide the dye polarizer that is finally formed with characteristics of polarization. For example, the alignment can specifically light alignment conducted with linearly polarized light. In other words, linearly polarized light is used to irradiate the base so that molecules of the dye mixture are oriented in a predetermined direction on the base. Or, alternatively, a polarization alignment film is formed, in advance, on the base and the polarization film solution is then coated on the polarization alignment film so that alignment may be conducted with the polarization alignment film. It is certainly possible to adopt other ways of alignment.

In S120, the reactive monomer is subject to curing on the base to form a first layer of dye polarization film. Specifically, in case that the reactive monomer is a heat-based reactive monomer, curing may specifically be conducted by applying heat to the reactive monomer to cure the reactive monomer; in case that the reactive monomer is a light based reactive monomer, curing may specifically be conducted by subjecting the reactive monomer to irradiation of ultraviolet light to have the reactive monomer cured.

In S130, the step of forming the dye polarization film may be repeated a number (n) of time to eventually form a dye polarizer that comprises said number plus one (n+1) layers of dye polarization film stacked on each other. In other words, a first layer of dye polarization film is formed on the base; a second layer of dye polarization film is formed on the first layer of dye polarization film, and so on. For example, for n=2, a dye polarizer that comprises three sequentially stacked layers of dye polarization film will be eventually formed. Preferably, n=2-4, meaning the dye polarizer comprises three to five (3-5) layers of dye polarization film. Such a dye polarizer possesses multiple film layers so that the degree of polarization can be improved, while the transmission rate does not lower excessively. In other embodiments, the number of the layers of dye polarization film involved in the dye polarizer can be determined according to practical requirements.

In the fabrication method 100 of the instant embodiment, a dye mixture that is formed by mixing multiple dichroic dyes can absorb visible light of all wave band so as to expand the range of wavelength of light absorbable by a regular dye polarizer and thus improve utilization of light. Through formation of dye polarizer by stacking multiple layers of dye polarization film, the degree of polarization of the dye polarizer can be increased. Since dyes of which the physical and chemical properties are more stable are used as ingredients, a polarizer so formed does not need to involve a TAC layer and other protection layers as required by a regular PVA (polyvinyl alcohol) based polarizer and this is advantageous for thinning of a display panel. Further, since a coating operation is adopted, it is flexible in forming a dye polarization film in either an outer side or an inner side of a substrate so that an externally mounted or internally arranged dye polarizer can be fabricated. When the dye polarizer is an internally arranged one, it may take the place of a regular PVA polarizer.

An embodiment of this application also provides a display panel that comprises a dye polarizer. The dye polarizer can be formed with the above-described fabrication method. The display panel includes, but not limited to, a liquid crystal panel, a quantum dot panel, and an organic light emitting display (OLED) panel.

Figure 2:
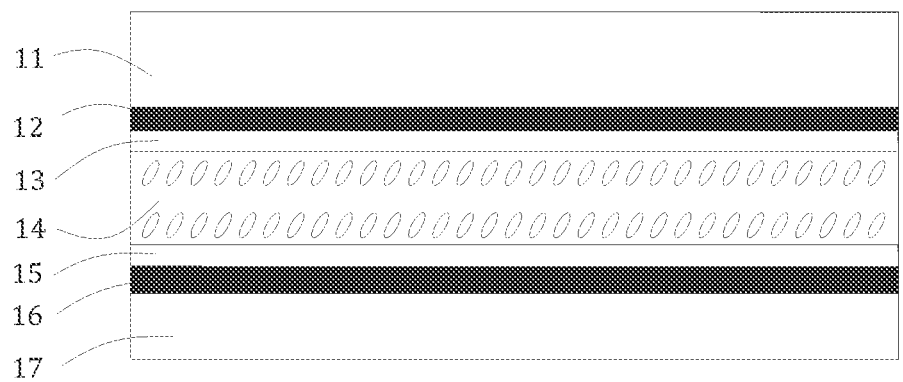
FIG. 2 is a schematic view illustrating a cross-sectional structure of a display panel according to an embodiment of this application.

For example, FIG. 2 illustrates, as an example, a display panel that is a liquid crystal panel 10. As shown in FIG. 2, the liquid crystal panel 10 comprises a thin-film transistor substrate 17, a color filter substrate 11, and a liquid crystal layer 14 filled between the thin-film transistor substrate 17 and the color filter substrate 11. A dye polarizer 16 is arranged between the thin-film transistor substrate 17 and the liquid crystal layer 14; and a dye polarizer 12 is arranged between the color filter substrate 11 and the liquid crystal layer 14. In the instant embodiment, the dye polarizer 16 and the dye polarizer 12 are both arranged internally of the liquid crystal panel 10 and this is advantageous for thinning of the liquid crystal panel 10 and helps improve durability of the dye polarizers.

As shown in FIG. 2, the color filter substrate 11 may be provided thereon with color filter units, a black matrix (BM), and an alignment layer 13. The thin-film transistor substrate 17 may be provided thereon with thin-film transistors (TFTs) and an alignment layer 15. It is noted that FIG. 2 just shows the structure of the liquid crystal panel in a schematic form.

The above provides only specific forms of embodiment of this application; however, the scope of protection of this application is not limited thereto. For those skilled in the technical field, equivalent modifications or substitutes may readily contemplated from the disclosure of the technical contents of this application. Such modifications or substitutes are covered by the protection scope of this application. Thus, the protection scope of this application can only be determined according to the appended claims.

What is claimed is:

1. A fabrication method for a dye polarizer, comprising:
adding a dye mixture and a reactive monomer in a solvent for dissolving therein to form a polarization film solution, wherein the dye mixture is formed by mixing multiple dichroic dyes and the dye mixture functions to absorb visible light of all wave band;
coating the polarization film solution on a base and carrying out alignment, and allowing the reactive monomer to cure on the base to form a dye polarization film; and
repeating the step of forming the dye polarization film for n times in order to form a dye polarizer that comprises n+1 layers of the dye polarization film that are stacked on each other, wherein n is a natural number that is greater than or equal to 2;
wherein the n+1 layers of the dye polarization film are identical to each other and comprise the cured reactive monomer and the dye mixture stacked on the base, wherein the n+1 layers of the dye polarization film are all identical to each other and are stacked on the base to form a stack of n+1 layers that are all identical, such that the stack is solely made up of layers that are all identical.

2. The fabrication method according to claim 1, wherein the dye mixture is formed by mixing three dichroic dyes of red color, orange color, and cyan color.

3. The fabrication method according to claim 2, wherein the solvent comprises dichloromethane or acetone.

4. The fabrication method according to claim 2, wherein in the step of "coating the polarization film solution on a base and carrying out alignment, and allowing the reactive monomer to cure on the base to form a dye polarization film", alignment is carried out as a light alignment operation conducted with linearly polarized light.

5. The fabrication method according to claim 2, wherein in the step of "coating the polarization film solution on a base and carrying out alignment, and allowing the reactive monomer to cure on the base to form a dye polarization film", curing is conducted by applying heat to the reactive monomer to cure the reactive monomer.

6. The fabrication method according to claim 2, wherein in the step of "coating the polarization film solution on a base and carrying out alignment, and allowing the reactive monomer to cure on the base to form a dye polarization film", curing is conducted by subjecting the reactive monomer to irradiation of ultraviolet light to have the reactive monomer cured.

7. The fabrication method according to claim 2, wherein the base comprises a substrate of a display panel or a functional film layer of the display panel.

8. The fabrication method according to claim 1, wherein the solvent comprises dichloromethane or acetone.

9. The fabrication method according to claim 1, wherein in the step of "coating the polarization film solution on a base and carrying out alignment, and allowing the reactive monomer to cure on the base to form a dye polarization film", alignment is carried out as a light alignment operation conducted with linearly polarized light.

10. The fabrication method according to claim 1, wherein in the step of "coating the polarization film solution on a base and carrying out alignment, and allowing the reactive monomer to cure on the base to form a dye polarization film", curing is conducted by applying heat to the reactive monomer to cure the reactive monomer.

11. The fabrication method according to claim 1, wherein in the step of "coating the polarization film solution on a base and carrying out alignment, and allowing the reactive monomer to cure on the base to form a dye polarization film", curing is conducted by subjecting the reactive monomer to irradiation of ultraviolet light to have the reactive monomer cured.

12. The fabrication method according to claim 1, wherein the base comprises a substrate of a display panel or a functional film layer of the display panel.

* * * * *